UNITED STATES PATENT OFFICE.

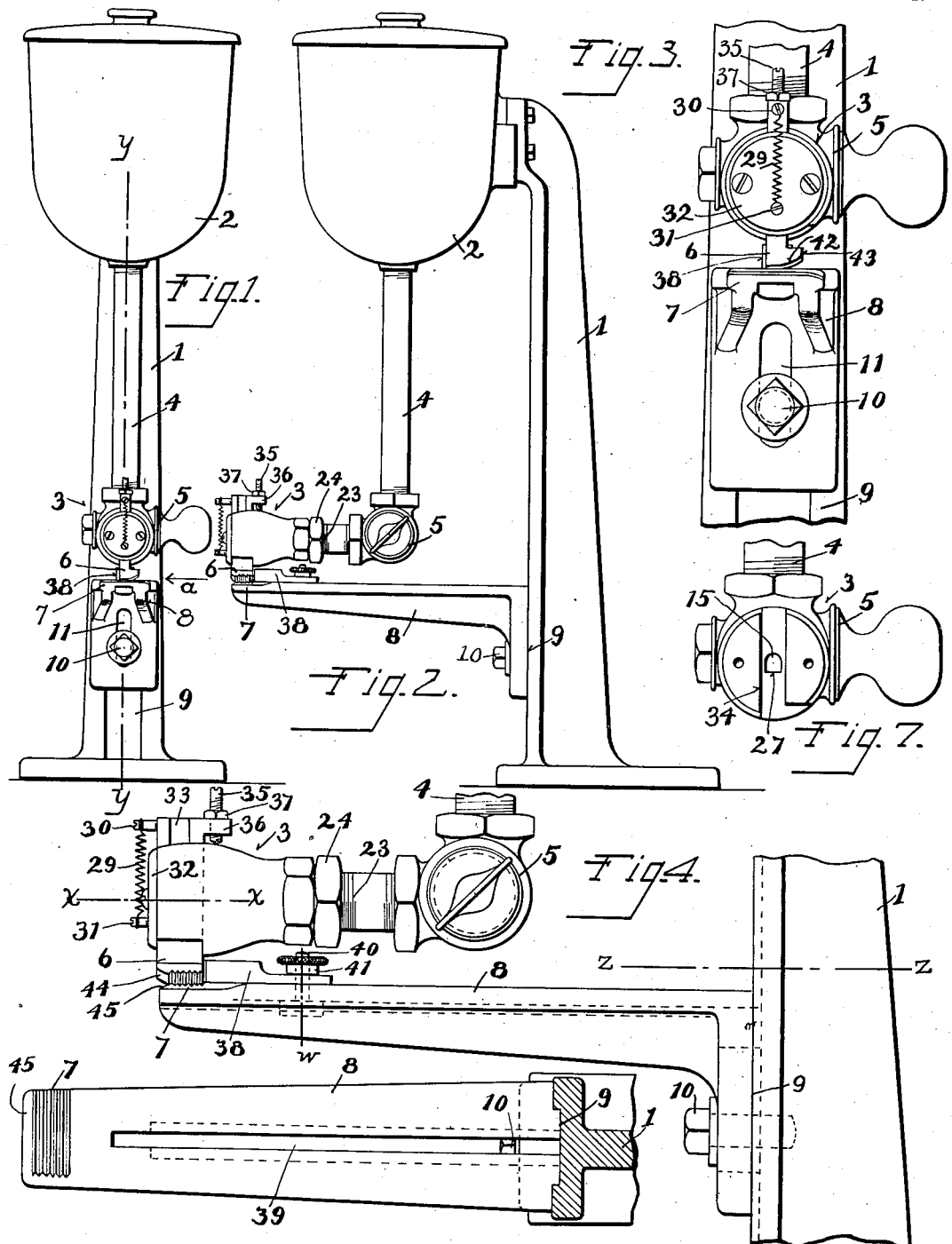

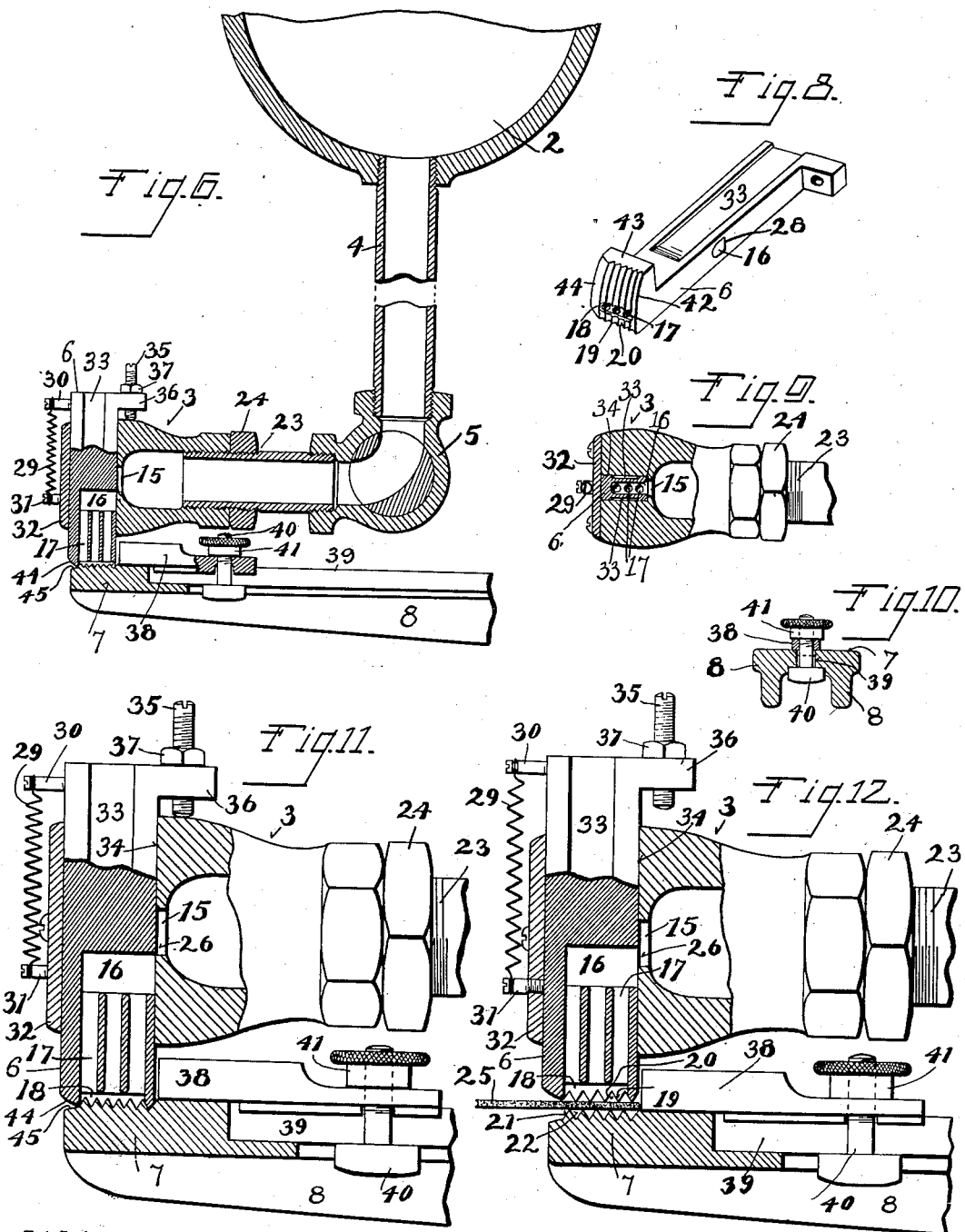

WILLIAM F. LAUTENSCHLAGER, OF CINCINNATI, OHIO, ASSIGNOR TO LORENZ MUTHER, OF DENVER, COLORADO.

CEMENT-APPLIER.

969,168.  Specification of Letters Patent.  Patented Sept. 6, 1910.

Application filed December 11, 1907. Serial No. 406,057.

*To all whom it may concern:*

Be it known that I, WILLIAM F. LAUTENSCHLAGER, a citizen of the United States, residing at Cincinnati, in the county of Hamilton and State of Ohio, have invented certain new and useful Improvements in Cement-Appliers, of which the following is a specification.

My invention is especially adapted for applying cement in the course of manufacture of boots, shoes and leather goods in which, for instance, in practice, the edge of the stock is provided with a strip of cement in locations where it is desired to form a turned-over edge or bead by bending the edge of the stock back upon itself, the cement maintaining the edge in beaded form, or for holding the stock in bent position until the same may be permanently sewed in subsequent operations. In practice cement is also employed for temporarily securing together the parts of a given article, such as a shoe, boot or slipper, as for instance, for temporarily securing the lining to the upper, so that the parts may not be misplaced during operation. One of the methods heretofore in quite general use has been to apply this cement by hand with a brush, but I find this method objectionable because of the waste of cement occasioned thereby and because it is impossible to apply the proper width of cement with speed to the parts. This method is also dangerous. The cement is viscous and is also highly inflammable. The cement being viscous or stringy, a large amount of cement is wasted between the cement-pot and the point where the cement is applied on account of the cement stringing between the brush and pot when the brush is removed from the body of cement in the pot after dipping the same therein.

The cement usually employed in work of this character is a composition containing rubber and benzin. It is of course obvious that other adhesive compositions may be employed in my improved device, the particular cement being instanced as exemplifying the utility of my invention. It has also been proposed to employ a cement-applying roller, to the periphery of which the cement is fed, the cement being applied to the goods by pressure between the roller and the goods, but I find this objectionable because the cement upon the face of the roller carries dirt and small fragments and the nap of the goods back into the cement-feeding channels and thereby clogs the feed of cement to the roller.

It is the object of my invention to avoid these objections and to provide a cement-applier capable of applying a strip of cement of proper width and to utilize the viscous or stringy properties of the cement in the application of the same to the goods, and further to provide a container for the cement from which it may be fed without exposure of the same.

The invention will be readily understood from the following description and claims, and from the drawings, in which latter:

Figure 1 is a front elevation of my improved device. Fig. 2 is a side elevation of the same. Fig. 3 is an enlarged front view of the applying head in connection with the stock-support. Fig. 4 is a side elevation of the same. Fig. 5 is a horizontal section taken on the line *z—z* of Fig. 4, showing a top view of the stock-support and the connection with the column. Fig. 6 is a vertical section taken on the line *y—y* of Fig. 1, partly broken away. Fig. 7 is a front elevation of the head with the feeding-foot removed for showing the feeding opening in the head. Fig. 8 is a bottom perspective view of the feeding-foot. Fig. 9 is a cross-section of the feeding-head on the line *x—x* of Fig. 4. Fig. 10 is a cross-section on the line *w* of Fig. 4, showing the connection between the stock-gage and the stock-support. Fig. 11 is a vertical section on the line *y—y* of Fig. 1 showing the supply-valve closed ready for the insertion of a piece of stock between the feeding-foot and stock-support; and, Fig. 12 is a similar view with a piece of stock introduced between the feeding-foot and stock-support.

1 represents a column on which there is a container 2.

3 is the applying-head which is connected with the container by a feeding-pipe 4 in which I prefer to provide a stop-cock 5. The head communicates with the container so that the cement in the latter may have free passage to the head.

6 is a feeding-foot which in the form shown also acts as a gate for cutting off the supply of cement when the applier is not being used and for automatically opening for furnishing the supply of cement when the applier is being used.

7 is a stock-support shown as a table composed of a bracket 8 secured to the column. This table is preferably adjustable vertically on the column as by means of a slideway 9 between the table and column and a bolt 10 passing through a slot 11 in the table and into the column.

The head is provided with an opening 15 communicating with the passage from the container, and the foot is provided with a transverse passage 16 from which a longitudinal aperture or apertures 17 extend to the bottom of the foot. I prefer to provide a plurality of these longitudinal apertures and to connect the same at the bottom of the foot by a transverse groove 18 in which the cement is adapted to spread so that the cement may be applied in unbroken width.

I prefer to provide the bottom of the pressure-foot with projections 19 extending longitudinally of the passage of the stock, as indicated by the arrow $a$, depressions 20 being located between the projections. I further prefer to provide the stock-support with longitudinal projections 21 between which depressions 22 are located, and to cause the projections 19 to register with the depressions 22, the projections 21 registering with the depressions 20 so that when the feeding-foot is depressed the respective projections may lie in the opposite depressions. The head is preferably attached to the pipe 4 by means of a threaded connection 23 and locked in place by a jam nut 24 for providing adjustment whereby the projections of the foot may register with the depressions on the stock-support, and vice versa. If now a piece of stock shown at 25 is inserted between the feeding-foot and stock-support, the feeding-foot will be raised not only to the extent of the thickness of the stock, but will be further raised to the extent to which the projections respectively extend into the depressions for providing a substantial opening at the valve 26 for the passage of cement therethrough. It will be noted from Fig. 11 that when the feeding-foot is depressed to fullest extent that the valve 26 is just closed and that any upward movement of the feeding-foot will open the valve, the extent of movement being indicated by a comparison of Figs. 11 and 12. To provide wide opening at this valve I form the mating edges of this valve with straight faces as shown respectively at 27 and 28 respectively at the opening 15 and transverse passage 16.

In order to cause depression of the feeding-foot, I provide a spring 29 secured to a screw 30 on the feeding-foot and a screw 31 on the retaining-plate 32. The feeding-foot, which in the form shown also constitutes a pressure-foot, is preferably provided with upright grooves 33 for reducing the friction between it and the channel 34 in the head in which the feeding-foot moves. These grooves also act as oil-passages to loosen the cement if any should work in between the foot and its bearing.

For adjusting the limit of descent of the feeding-foot I provide a set-screw 35 in a lug 36 on the feeding-foot, the set-screw striking the head and being held in place by a jam-nut 37.

38 is a stock-gage adapted to be secured at suitable points on the stock-support so that the cement may be applied either at the edge or away from the edge of the stock. I accomplish this adjustment by providing the stock-support with a slot 39, a headed bolt 40 passing through said slot and the gage, a nut 41 clamping the parts in adjusted position.

The projections and depressions on the feeding-foot help to spread the cement. The cement deposited in the transverse groove 18 contacts the surface of the stock being cemented while the same is passed under the feeding-foot. This deposit is then acted on by those parts of the projections in rear or at the feeding-out side of said groove, which permits the cement to pass through the depressions at the feeding-out side of said foot in sufficient body to fill the interstices of the surface of the stock and to press the cement into the same, the stringy properties of the cement tending to aid the feed of the cement by drawing the same away from the groove and feeding apertures, the cement thus withdrawn being instantly replenished from the supply above. The cement is compacted into the stock and spread throughout the width of intended application and prevented from spreading beyond such intended width. The projections also reduce friction between the stock and the feeding-foot and support.

In order to aid the ready insertion of stock between the feeding-foot and stock-support I prefer to provide the under surface of the foot with a forward upward curve as shown at 42, which is preferably located at the under face of the toe 43 of said foot, and to provide the edges of the foot and table respectively with slopes 44 and 45.

Having thus fully described my invention what I claim as new and desire to secure by Letters Patent is:

1. In a cement applier, the combination of a cement-feeding part, and a stock-opposing part therefor, the said parts having projections and depressions between them, the projections of one normally being in the depressions of the other and arranged for being separated by the stock being cemented.

2. In a cement applier, the combination of a cement-feeding part, a stock-opposing part therefor, said parts provided with projections and depressions between them, the said projections of one of said parts normally registering with the depressions of the other of said parts, and means for causing adjustment between said parts laterally for adjusting said registry.

3. In a cement applier, the combination of a cement-pot, a cement-feeding part, and a stock-opposing part for said cement-feeding part, said parts having projections and depressions between them and further having a cement-conduit having connection with said cement-pot and terminating at said projections and depressions, the projections of one of said parts normally being in the depressions of the other of said parts and arranged for being separated by the stock being cemented, substantially for the purpose described.

4. In a cement applier, the combination of a feeding-foot, a support in which the same has movement, said foot having a feeding aperture, there being a cement-feeding opening between said foot and support having connection with said aperture and arranged to be opened and closed by the movement of said foot, a stock-support under said foot, said foot and support having apposite and opposite projections and depressions between them normally located in each other's lateral planes, and a stock-gage adjustable at the side of said foot, substantially for the purpose described.

5. In a cement applier, the combination of a support, a cement-applying part and a stock-opposing part for said cement-applying part, said cement-applying part having movement in said support occasioned by the passage of stock between said parts, said cement-applying part being provided with a cement-feeding aperture, there being a cement-feeding opening between said cement-applying part and support having connection with said aperture arranged to be controlled by the said movement of said cement-applying part, and said cement-applying part being provided with a plurality of projections and depressions arranged side by side crosswise of the path of travel of the stock between said cement-applying part and stock-opposing part therefor for spreading the cement laterally which passes through said cement-feeding aperture, substantially for the purpose described.

6. In combination, in a cement applier, a pressure-foot and a stock-opposing part therefor arranged for having stock pass between them, said pressure-foot being provided with a cement-feeding aperture, said pressure-foot having a stock-contacting face provided with a plurality of alternating projections and depressions located side by side crosswise of the path of travel of said stock in rear of the mouth of said cement-feeding aperture for spreading the cement from said cement-feeding aperture laterally, substantially as described.

7. In combination, in a cement applier, a pressure-foot and a stock-opposing part therefor arranged for having stock pass between them, said pressure-foot being provided with a plurality of cement-feeding apertures 17 located side by side crosswise of the path of travel of said stock, the stock-engaging face of said pressure-foot being provided with a transverse groove 18 extending crosswise of said path of travel of said stock and connecting said apertures, and said pressure-foot in rear of said transverse groove being provided with spreading means for the cement for spreading said cement received from said transverse groove laterally on said stock, substantially for the purpose described.

8. In a cement applier, the combination of parts having opposing stock-faces having simultaneously apposite and opposite projections and depressions, said parts comprising feeding valve-mechanism, with means for permitting movement between said faces toward and from each other for effecting the opening of said valve-mechanism.

9. In a cement applier, the combination of parts having opposing stock-faces and embracing feeding valve-mechanism, said faces having registering projections and depressions between them normally within each other's lateral planes, and means causing said faces to separate by the stock passed therebetween for bringing said projections and depressions on said respective faces out of lateral plane with each other and thereby operating said valve-mechanism.

10. In a cement applier, the combination of a stock-support, a feeding-foot provided with a cement feeding aperture, a support in which said foot has movement, said foot and support embracing feeding valve-mechanism, said stock-support and foot having registering projections and depressions between them normally within each other's lateral planes, constructed and arranged for operating said valve-mechanism by the passage of the stock between said stock-support and foot, said stock causing said projections and depressions on said stock-support and foot respectively to relatively pass out of each other's lateral planes, for increasing the extent of operation of said valve-mechanism, and a spring for depressing said foot.

11. In a cement applier, the combination of a stock-support, a feeding-foot provided with a cement feeding aperture, a support in which said foot has movement, said foot and support embracing feeding valve-mechanism, said stock-support and foot having registering projections and depressions between them normally within each other's lateral planes, constructed and arranged for operating said valve-mechanism by the passage of the stock between said stock-support and foot, said stock causing said projections and depressions on said stock-support and foot respectively to relatively pass out of each other's lateral planes for increasing the extent of operation of said valve-mechanism, a spring for depressing said foot, and means for adjustably limiting the movement of said foot toward said stock-support.

12. In a cement applier, the combination of parts having opposing stock-faces provided with registering projections and depressions, the projections on one of said stock-faces being normally in the depressions of the other of said stock-faces, and means permitting separation of said parts to the extent to which said projections and depressions normally extend into each other's lateral planes plus the thickness of the stock passed between the same upon the insertion of said stock between said faces, said parts embracing feeding valve-mechanism operated by said separation.

13. In a cement applier, the combination of a support, a cement-feeding foot movable thereon, and a cement reservoir, said support having an opening 15 having communication with said cement reservoir, said feeding-foot being provided with a passage 16 normally out of registry with said opening 15, and with apertures 17 located side by side crosswise of the path of travel of the stock passing said feeding-foot, and arranged for feeding cement to said stock being fed, said foot being provided with spreading means to rear of said apertures for laterally spreading the cement received on said stock from said apertures, substantially as described.

14. In a cement applier, the combination of a support, a cement-feeding foot movable thereon, and a cement reservoir, said support having an opening 15 communicating with said cement reservoir, said feeding-foot being provided with a passage 16 normally out of registry with said opening 15, and with an aperture 17 connecting said passage with the feeding face of said feeding-foot, said feeding-foot being provided with a plurality of projections and depressions located side by side crosswise of the path of travel of the stock passing said feeding-foot positioned to rear of the mouth of said aperture for spreading the cement received from said aperture on said stock crosswise of the path of travel thereof, substantially as described.

15. In a cement applier, the combination of a cement reservoir, a support, and a cement-feeding foot movable on said support, said support having an opening 15 communicating with said cement reservoir, said feeding-foot having a transverse passage 16 normally out of line with said opening 15, said feeding-foot being further provided with an aperture 17 and at its contact-face with the stock being provided with a transverse groove 18 positioned crosswise of the path of travel of said stock passing said foot, and said feeding-foot having spreading means to rear of said transverse groove for spreading the cement received in said groove on said stock laterally of the said path of travel of said stock, substantially as described.

16. In a cement applier, the combination with a support, a cement-feeding foot slidable thereon, and a cement reservoir, said support having an opening 15 in communication with said cement reservoir, said feeding-foot having a transverse passage 16 normally out of line with said opening 15, the feeding-face of said feeding-foot being provided with a transverse groove 18 which extends crosswise of the path of travel of the stock passing said foot, said foot being provided with spreading means for cement located in rear of said transverse groove 18, there being a passage in said foot between said transverse passage 16 and transverse groove 18, and said support and feeding-foot having a groove 33 between them, substantially as described.

In testimony whereof, I have subscribed my name hereto in the presence of two subscribing witnesses.

WILLIAM F. LAUTENSCHLAGER.

Witnesses:
  WILLIAM C. TATMAN,
  EARLE R. PASSEL.